United States Patent [19]
Frohlich et al.

[11] Patent Number: 6,108,489
[45] Date of Patent: *Aug. 22, 2000

[54] FOOD WARNING DEVICE CONTAINING A RECHARGEABLE PHASE CHANGE MATERIAL

[75] Inventors: Sigurd Frohlich, Escondido; Hans Jochen Koellner, Santa Barbara, both of Calif.; Ival Salyer, Dayton, Ohio

[73] Assignee: Phase Change Laboratories, Inc., San Diego, Calif.

[ * ] Notice: This patent is subject to a terminal disclaimer.

[21] Appl. No.: 09/268,225

[22] Filed: Mar. 15, 1999

Related U.S. Application Data

[63] Continuation-in-part of application No. 08/954,318, Oct. 17, 1997, Pat. No. 5,884,006.

[51] Int. Cl.⁷ .................................. F24H 7/00; H05B 3/60
[52] U.S. Cl. ........................ 392/346; 392/339; 219/528; 219/387; 219/529; 219/530; 126/263.01
[58] Field of Search .................................... 219/730, 759, 219/654, 529, 530, 387; 392/346, 339; 126/236.01

[56] References Cited

U.S. PATENT DOCUMENTS

| | | | |
|---|---|---|---|
| 4,528,439 | 7/1985 | Marney, Jr. et al. | 219/386 |
| 5,052,369 | 10/1991 | Johnson | 126/400 |
| 5,424,519 | 6/1995 | Salee | 219/759 |
| 5,565,132 | 10/1996 | Salyer | 252/70 |
| 5,750,962 | 5/1998 | Hyatt | 219/528 |
| 5,755,987 | 5/1998 | Goldstein et al. | 252/70 |
| 5,804,266 | 9/1998 | Salyer | 428/35.2 |
| 5,884,006 | 3/1999 | Frohlich et al. | 392/339 |
| 5,885,475 | 3/1999 | Salyer | 252/70 |
| 5,892,202 | 4/1999 | Baldwin et al. | 219/387 |
| 5,916,470 | 6/1999 | Besser et al. | 219/730 |

*Primary Examiner*—Teresa Walberg
*Assistant Examiner*—Vihod D Patel
*Attorney, Agent, or Firm*—Killworth, Gottman, Hagan & Schaeff, LLP

[57] ABSTRACT

A heating device for food and other products is provided. The device includes a unit containing a rechargeable phase change material which is capable of being charged with heat energy by a heat source such as a conduction, convection, radiant heat, electrical resistance, electrical inductance, microwave, or radio frequency. The phase change material may be provided in a variety of forms and may comprise linear alkyl crystalline alkyl hydrocarbons, alkyl hydrocarbon waxes, crystalline fatty acids, linear crystalline primary alcohols, ethylene copolymers, polyethylene, polyethylene glycol, polyethylene oxide, and acetamide.

23 Claims, 4 Drawing Sheets

FOOD WARNING DEVICE CONTAINING A RECHARGEABLE PHASE CHANGE MATERIAL

CROSS-REFERENCE TO RELATED APPLICATION

This application is a continuation-in-part of U.S. application Ser. No. 08/954,318 filed Oct. 17, 1997, now U.S. Pat. No. 5,884,006.

BACKGROUND OF THE INVENTION

The present invention relates to a device for heating foods and the like which includes a rechargeable phase change material. Once charged with heat energy, the phase change material radiates heat energy to keep foods and other objects warm.

For delivery of food and other products, insulated boxes and thermal bags are currently used to keep the food warm while it is transported from one place to another. Typically, these bags and boxes also include a heat reflective material on their inner surfaces. Even though the food is stored in an insulated box or bag, the temperature of the food begins declining once the food is removed from the cooking device. Thermal bags and boxes only serve to reduce the rate at which the food loses heat and do not maintain the temperature of the food.

Phase change materials have been found to be particularly useful for food warming, especially during transport, because they utilize their latent heats of fusion for thermal storage. The latent heat of fusion of a phase change material is substantially greater than the sensible heat capacity of the material. Upon melting and freezing, per weight, a phase change material absorbs and releases substantially more energy than a sensible heat storage material which is heated and cooled in the same temperature range. In contrast to a sensible heat storage material which absorbs and releases heat energy essentially uniformly over a broad range of temperature, a phase change material absorbs and releases a large quantity of energy in the vicinity of its melting/freezing point in a controlled manner. In addition to its latent heat storage capacity, a phase change material also stores and releases sensible heat.

Various food warming devices containing phase change materials have been proposed. See, for example, the following U.S. Pat. Nos. 4,246,884; 4,982,722; 5,254,380; and 5,520,103. However, most of these devices are designed so that the phase change material is charged by heating the device in a convection oven. When heated in this manner, a lengthy period of time is required to charge the phase change material. Further, once these devices have been heated, they continue to lose heat as the phase change material discharges its stored heat energy.

A device having an electric heating element sandwiched between two crosslinked high density polyethylene (HDPE) sheets is currently available from Vesture Corporation (the Vesture Heat Storage Board). In some instances, a plastic, such as HDPE, can be considered to be a phase change material. However, the maximum latent heat of such a product occurs at about 132° C., a temperature that is too high for hot food serving since it might dry or char the food and could burn the people handling the food. At the lower temperature of about 60° C. desired for hot food serving, the Vesture Heat Storage Board will only store and release the sensible heat of the cross-linked HDPE which produces only about 6 calories over a temperature range of 10° C. This value is very low and is, even then, available for only a short period of time (determined by the insulation) because cross-linked HDPE has little capacity for thermal energy storage below its crystalline melting temperature of about 132° C. For these reasons, it appears that the cross-linked HDPE plates or sheets are simply being used in the Vesture Heat Storage Board as a cover to protect an electric heating element which is the source of the energy for food warming purposes.

Another heating device is disclosed in U.S. Pat. No. 5,750,962, assigned to Vesture Corporation. This device includes a paraffin-based phase change material and includes an electrically resistive heating element which operates to control heating of the phase change material.

However, a need still remains in the art for a food warming device which can employ a variety of phase change materials which emits heat for longer periods of time than currently used devices, and which can be easily recharged using a variety of heat sources.

SUMMARY OF THE INVENTION

The present invention provides a solution to the needs currently existing in the art by providing a food heating device employing a rechargeable phase change material which emits heat for longer periods of time than currently used devices and which can be easily recharged. The phase change material may be provided in a variety of forms and may be heated using a variety of heat sources including conduction, convection, radiant, electrical resistance, electrical inductance, and microwave.

According to one aspect of the invention, a heating device for food and the like is provided comprising a container and a rechargeable phase change material unit removably positioned in the container. The rechargeable phase change material unit includes a first shell portion and a second shell portion forming a cavity with at least one layer of a phase change component including a phase change material disposed in the cavity. The phase change material is selected from the group consisting of linear crystalline alkyl hydrocarbons, alkyl hydrocarbon waxes, crystalline fatty acids, linear crystalline primary alcohols, ethylene copolymers, polyethylene, polyethylene glycol, polyethylene oxide and acetamide. The phase change material is capable of being charged with heat energy by a heat source selected from the group consisting of conduction, convection, radiant, electrical resistance, electrical inductance, microwave, or combinations thereof to maintain the device at a desired temperature.

Where the heat source comprises microwave heat (such as from a microwave oven), the phase change material preferably includes a microwave absorbing additive selected from the group consisting of water, glycerol, glycerol esters, polyethylene glycol and carbon black.

In a preferred embodiment of the invention, the phase change material comprises a linear crystalline alkyl hydrocarbon having a melting point of from about 25° C. to 100° C. The phase change component may be provided in several forms. For example, the phase change component may be provided in the form of a dry powder comprising from about 50–70% by weight of the phase change material and from about 30–50% by weight silica, or it may be in the form of a gel comprising from about 75–85% by weight of the phase change material and from about 15–25% by weight silica.

In another embodiment of the invention, the phase change component comprises a melt mix comprising from about 60% by weight of a phase change material, 16% by weight high density polyethylene, 8% by weight of an ethylene-vinyl acetate copolymer, and 16% by weight silica. In this embodiment, the phase change material preferably comprises a low molecular weight, high density polyethylene or a low molecular weight, high density polyethylene containing a small amount of propylene to form an ethylene/propylene copolymer.

In still another embodiment, the phase change component comprises a crosslinked high density polyethylene sheet permeated with a linear crystalline alkyl hydrocarbon phase change material.

In a preferred embodiment of the invention, the heating device further includes a heater assembly positioned on one side of the layer of phase change component. The heater assembly preferably includes a heating element to charge the phase change material with heat energy and a heat transfer element which distributes heat from the heating element throughout the layer of phase change component during the charging of the phase change material. The heating element preferably comprises a printed circuit, a laminated wire or a flexible silicone heater assembly.

In another embodiment of the invention, a device for heating food and the like is provided comprising a container and a rechargeable phase change material unit removably positioned in the container. The unit includes a first shell portion and a second shell portion forming a shell having a cavity, with at least one layer of a phase change component including a phase change material disposed in the cavity. In this embodiment, the phase change component comprises a solidified melt mixture of a polyolefin resin, an ethylene copolymer, silica particles and a phase change material, and the phase change material is charged with heat energy by a convection oven to maintain the device at the desired temperature. The melt mixture preferably comprises from about 60% by weight of the phase change material, 16% by weight high density polyethylene, 8% by weight of an ethylene-vinyl acetate copolymer, and 16% by weight silica. The phase change material material in the melt mixture is preferably an ethylene-propylene copolymer.

In yet another embodiment of the invention, the heating device utilizes a phase change component comprising a porous product which has been imbibed with a phase change material. By porous product, it is meant products including, but not limited to particle board, plasterboard, wallboard, fiberboard, insulation, foams, floor panels, and the like. The phase change material preferably comprises an alkyl hydrocarbon, and also preferably contains up to about 5% by weight of a polymeric thickening agent. The thickening agent may comprise an ethylene-propylene copolymer, butyl rubber, a styrene-butadiene copolymer, or polyethylene.

In this embodiment, the heat source may be selected from the group consisting of conduction, convection, radiant heat, electrical resistance, electrical inductance, microwave, radio frequency, or combinations thereof. Where the heat source comprises microwave or radio frequency, the phase change material preferably includes an additive selected from the group consisting of water, glycerol esters and polyethylene glycol.

In all of the above-described embodiments, the container comprising the heating device may provided in several forms such as a pizza heater, or other food heating device where the food is, like pizza, transported in an insulated bag, or tableware and the like such as coffee cups, carafes, and serving trays.

Accordingly, it is an object of the present invention to provide a device for heating food which includes a rechargeable phase change material. These, and other objects and advantages of the present invention, will become apparent from the following drawings, detailed description and claims.

DETAILED DESCRIPTION OF THE INVENTION

Figure 1:
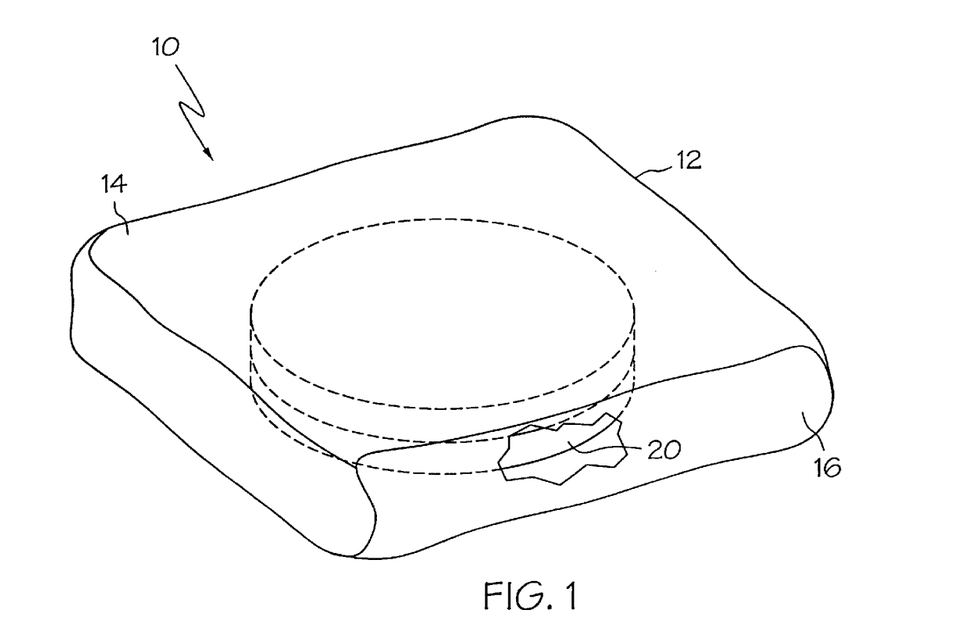
FIG. 1 presents a perspective view of a food heating device of the present invention

A perspective view of a food heating device 10 of the present invention can be seen in FIG. 1. The device 10 includes a container 12 and a unit 20 which contains a phase change component including a phase change material. The container 12 can be a bag such as a pizza warmer, a box, cup, dish, bowl, platter or food serving tray, or any type of device used to receive and/or transport food or beverages. In the embodiment shown in FIG. 1, the container 12 is a bag-shaped container having insulated walls 14 and an operable lid 16. The container 12 can also have a heat reflective material positioned on or coated on the insulated walls 14. The unit 20 is preferably removably positioned in container 12.

Figure 2:
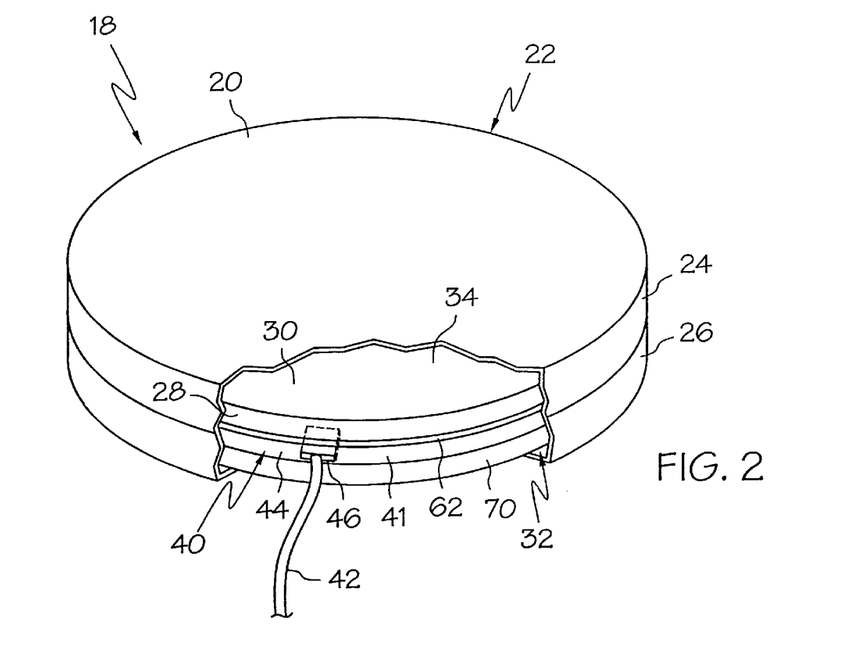
FIG. 2 presents a cutaway view of the rechargeable phase change material unit.

One embodiment 18 of the rechargeable phase change material unit 20 of this invention is shown in FIG. 2. The unit 20 includes a shell 22 which is formed from a first shell portion 24 and a second shell portion 26 and contains at least one layer 28 of a phase change component 30. First shell portion 24 and second shell portion 26 form a cavity 32 in which the layer 28 of phase change component 30 is positioned. The layer 28 of phase change component 30 is positioned adjacent either first shell portion 24 or second shell portion 26.

Desirably, the layer 28 of phase change component 30 is formed into a discrete shape 34, such as a disk or a sheet. The layer 28 of phase change component 30 can have any size or shape as long as it can be contained in shell 22. By forming the layer 28 of phase change component 30 into the discrete shape 34, the unit 20 can be easily manufactured. The phase change component 30 can be formed to the desired shape by means of any means currently used in the art to form polymeric materials into particular shapes. Useful means include compression molding, injection molding, co-injection molding and casting.

The phase change component 30 includes a phase change material which is selected from the group consisting of linear crystalline alkyl hydrocarbons, alkyl hydrocarbon waxes, crystalline fatty acids, linear crystalline primary alcohols, ethylene copolymers, polyethylene, polyethylene copolymers, polyethylene glycol, polyethylene oxide, and acetamide. Preferred phase change materials for use with this invention have a melting/freezing temperature from about 25° C. to about 100° C. If the phase change material unit 10 is used to heat meat products for delivery purposes, then the desired phase change material has a minimum melting/freezing temperature of at least about 60° C. to comply with governmental regulations relating to the delivery temperature of meat products.

The phase change component may be provided in a number of different forms. For example, the phase change component may be provided in the form of a dry powder comprising from about 50–70% by weight of a phase change material and from about 30–50% by weight silica, or it may be in the form of a gel comprising from about 75–85% by weight of a phase change material and from about 15–25% by weight silica. In these embodiments, the phase change material preferably comprises a linear crystalline alkyl hydrocarbon.

Preferred alkyl hydrocarbon phase change materials for use in the present invention include commercially available waxes such as Paraflint C80 (MP 80° C.) and M7395 (MP 88° C.) available from Schümann Sasol of South Africa; Parvan R7149 (MP 64° C.) and R7165 (MP 72° C.) available from Exxon Corporation of Houston, Tex.; Shellwax 100 (MP 42–44° C.), Shellwax 120 (MP 44–47° C.), Shellwax 200 (MP 52–55° C.), Shellwax 300 (MP 60–65° C.) all of which are products of Shell Oil Co., Houston, Tex.; Boron R-152 (MP 65° C.) a product of BP America, Cleveland, Ohio; Union SR-143 (MP about 61° C.) a product of Union Oil Co., Los Angeles, Calif.; Witco 128 (MP about 53° C.), Witco LLN, Witco 45A, Witco K-18, Witco K-19, Witco K-61, Witco K-51, and Witco 85010-1 all products of Witco Corp., New York, N.Y., Aristowax 143 (MP 34–61° C.) from Unocal Corp., Los Angeles, Calif.; and Paraffin 150 (MP about 61° C.).

The phase change component may also be in the form of a crosslinked high density polyethylene sheet permeated with a linear crystalline alkyl hydrocarbon.

The phase change component may also comprise a porous product which has been imbibed with a phase change material. In this embodiment, the phase change material preferably comprises an alkyl hydrocarbon, and contains up to about 5% by weight of a polymeric thickening agent which preferably comprises an ethylene-propylene copolymer, a styrene-butadiene copolymer, butyl rubber, or polyethylene.

The phase change material is charged with heat energy by a heat source which may include conduction, convection, radiant heat, electrical resistance, electrical inductance, microwave heat, radio frequency.

Where the phase change material is charged using a microwave oven, the phase change material preferably includes a microwave absorbing additive selected from the group consisting of water, glycerol, glycerol esters, polyethylene glycol, and carbon black.

Where the phase change material is charged in a convection oven, the phase change material preferably comprises a solidified melt mixture of a polyolefin resin, an ethylene-vinyl acetate copolymer, silica particles, and a phase change material. The phase change material preferably comprises a low molecular weight, high density polyethylene or an ethylene-propylene copolymer formed from a low molecular weight, high density polyethylene containing a small amount of propylene.

The polyolefin resin is desirably a high-density polyethylene (HDPE) or polypropylene having a molecular weight or melt index in the range of 0.5 to 5 decigrams/minute. A useful high density polyethylene is available from Equistar Plastics, Inc. of Cincinnati, Ohio. The HDPE, when it cools from the melt, establishes a matrix within which the lower melting phase change material can melt and freeze without changing the volume of the composite significantly. Thus, the melting temperature of the polyolefin must be well above the highest temperature that will be encountered in use. For this reason, commercial low-density polyethylenes would be less desirable though not without some utility. It also is possible to substitute a higher melting polypropylene for HDPE, which may be a decided advantage in some applications, although, processing is more difficult.

The ethylene copolymer serves a compatibilizing bridge between the low molecular weight phase change material and the high molecular weight, high melting HDPE or polypropylene. The ethylene copolymer is desirably an ethylene-vinyl acetate copolymer containing approximately 10–20% by weight vinyl acetate, but may also be an ethylene-methyl acrylate copolymer, an ethylene-ethyl acrylate copolymer, or equivalent molar copolymer. A series of ethylene-vinyl acetate (EVA) copolymers containing from 5 to 28% wt. of vinyl acetate were tested for compatibility and phase change material oozing reduction. As a result, copolymers in the range of 10–20% wt. of vinyl acetate are desired and those containing about 15–17% wt. vinyl acetate most desired. A useful EVA copolymer is available from Equistar Plastics of Cincinnati, Ohio. Generally, comparable compatibility and non-oozing could be obtained in melt-mixed blends wherein equivalent quantities of ethylene/methyl acrylate (EMA), or ethylene/ethyl acrylate (EEMA) are substituted for EVA.

The silica in the composite phase change material is added to tie up the low-melting phase change material in a stable gel to further prevent oozing. The silica also serves to increase heat transfer throughout the melt mix phase change material. The amount of silica corresponds to the amount of the phase change material and should be about 10–30 wt. % of the phase change material. The silica particles are desirably precipitated silica particles having a surface area of from 50 to 500 square meters per gram and primary particle sizes of from 0.005 to 0.025 microns. Desirably, the silica is a hydrated amorphous silica available from PPG Industries Inc., of Pittsburgh, Pa. However, other precipitated silicas having a comparable particle size and surface area would work equally as well. Fumed silicas of comparable or smaller particle size and equal or greater surface area should also be satisfactory, but are much more expensive.

Another useful silica is a precipitated or fumed silica which has been surface treated with silane coupling agents or silicone resins to provide a hydrophobic surface which renders the silica unaffected by water or relatively high humidity. Hydrophobic silica is desired because it also more receptive to the alkyl hydrocarbon phase change material.

The ethylene-propylene copolymer phase change material is commercially available from Petrolite-Baker Corp. under the designation PETROLITE® EP-700.

Depending on the heat source used, the heating device may include a heater assembly 40 positioned on one side of the layer 28 of phase change component 30 in cavity 32 as shown in FIG. 2. Heater assembly 40 is provided to charge the phase change material in the phase change component with heat energy and to distribute the heat energy throughout the layer 28 of phase change component 30 during charging.

Heater assembly 40 is positioned adjacent to the layer 28 of phase change component 30 on the opposite side of the layer 28 from either first shell portion 24 or shell portion 26. Heater assembly 40 may be either a heating element 41, a heat transfer element 62 or a combination of a heating element 41 and a heat transfer element 62.

Desirably, heater assembly 40 includes a heating element 41, as shown in FIG. 2. Heating element 41 can be either a direct current electric heating element or an alternating current electric heating element. Heating element 41 further includes electric lead line(s) 42 which are provided to supply heating element 41 with electric current. Electric lead line(s) 42 can terminate in a connector such as a male plug, a female plug, alligator clips, a banana plug, battery connectors, battery adapters, current adapters and other similar devices to connect the heating element 41 to a power source. The rechargeable phase change material unit 20 can be adapted to incorporate a female plug positioned along the periphery of shell 22 so that detachable electric lead lines can be used with heating element 41.

Heating element 41 can be any type of electric heating element. Desirably, heating element 41 is a printed circuit 44, a laminated wire or a flexible silicone heater assembly, such as that shown in FIGS. 5 and 6. Useful flexible printed circuits or laminated wires can be formed from MYLAR®, KEVLAR® or other similar high temperature plastic or silicon substances, such as silicon rubber or fiberglass reinforced silicon rubber. If heating element 41 is a printed circuit or a laminated wire, it will desirably have a circuit pattern which conforms to either the shape of shell 22, the shape of the layer 28 of phase change component 30, or both. Desirably, it will conform to the shape of the layer 28 or phase change component 30, if the layer 28 of phase change component 30 has a discrete shape. It is also desirable that the heating element 41 have an output from about 100 watts to about 300 watts.

The heating element 41 desirably includes a temperature sensitive element 46 which is provided to control the temperature to which the layer 28 of phase change component 30 is heated. This temperature sensitive element 46 is provided to prevent the phase change component 30 and heater assembly 40 from being damaged by the application of excessive heat. Useful devices for temperature sensitive element 46 include, but are not limited to, thermostats, thermistors, thermal protection fuses and other similar devices. Alternatively, heating element 41, or a portion thereof, could be formed from a positive temperature coefficient material. This type of material acts as its own temperature control device by experiencing an increase in its internal resistance as the temperature of the material increases. If such a material is used, then it is unnecessary to employ a temperature sensitive element.

Although it is not shown in the drawings, the rechargeable phase change material unit 20 may also include an indicator light. The indicator light can be used to indicate whether the heater assembly 40 is heating the phase change material to the desired temperature. The indicator light can also be used to indicate that the phase change material has attained a temperature useful for heating a desired object.

Because most phase change materials 30 are not particularly good conductors of heat energy, heater assembly 40 may also include at least one heat transfer element 62 disposed between the heating element 41 and the layer 28 of phase change component 30. If embodiment 18 includes two layers 28 of phase change component 30, then a second heat transfer element 62 is also used. The heat transfer element 62 is provided to minimize the occurrence of "hot spots." The heat transfer element 62 also serves to distribute heat throughout the entirety of the phase change component 30 and not just to those areas of the phase change component 30 which are adjacent to or in direct contact with the heating element 41. By distributing heat throughout the phase change component 30, the rechargeable phase change material unit 20 can evenly radiate heat so that the unit 10 will evenly heat items such as food. When such items are evenly heated, they retain heat for long periods of time. Desirably, heat transfer element 62 is formed from a heat transfer material such as, for example, foils, sheets, and screens formed from any heat conducting material, including fiberglass reinforced silicones, which does not react with the phase change component 30 or corrode when repeatedly heated and cooled over extended periods of time. In one aspect of the invention, the heat transfer element 62 is either a foil or screen formed from either copper or aluminum. Desirably, the heat transfer element 62 is an aluminum foil. The heat transfer element 62 can either be unattached or attached to heating element 41. If the heat transfer element 62 is attached to heating element 41, it can be attached in any manner currently in use in the art such as by gluing, welding, etc.

The embodiment 18 may also include a layer of thermally insulating material 70 positioned between the heating element 40 and the second shell portion 26. This insulating material 70 prevents the second shell portion 26 from becoming heated. The insulating material 70 can also be formed from or coated with a material which directs heat generated by the heater assembly 40 toward the layer 28 of phase change component 30. Useful insulating materials include, but are not limited to, ceramics, stone, glass wool, rock wool, plastics and foams, such as polyurethane foams.

Although not shown, the embodiment 18 may include a second layer 28 of phase change component 30 in place of the insulating material 70. If a second layer 28 of phase change component 30 is used, then a second heat transfer element such as heat transfer element 62 will also be used.

Embodiment 18 of the rechargeable phase change material unit 20 functions in the following manner. To heat an object, the heater assembly 40 is supplied with electricity which causes the heating element 41 to heat. As the heating element 41 is heated, the phase change material contained in layer 28 of phase change component 30 is charged with heat energy. To ensure even heating of the phase change component 30, the heat transfer element 62 is provided. Because it is formed from a heat conductive material, the entire heat transfer element 62 becomes heated by the heating element 41. The heat transfer element 62 then conducts heat to all portions of the layer 28 of phase change component with which it is in contact. The phase change material is heated to its melting point, at which it stores the heat energy. Once the phase change material is heated to a particular temperature as indicated by the temperature sensitive element 46, the power supply to the heating element 41 is closed off. Once heat is no longer supplied to the phase change material, the phase change material radiates heat. This heat is radiated through the shell 22 to the object to be heated and the object is heated. The insulating material 70 prevents second shell portion 26 from becoming heated so that second shell portion has a lower temperature than that of first shell portion 24. This lower temperature then allows the embodiment 18 of the rechargeable phase change material unit 20 to be handled.

Figure 3:
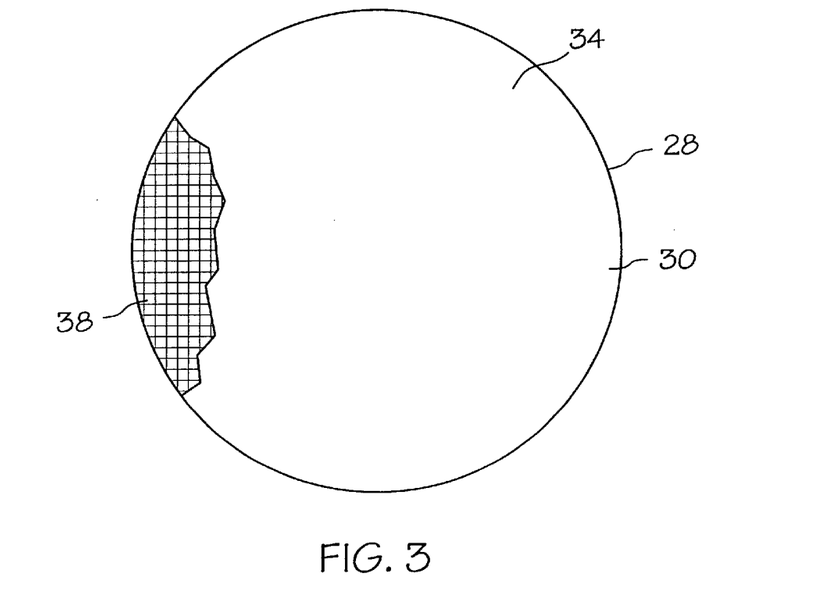
FIG. 3 present a top view of a layer of phase change material partially cutaway to show a reinforcing grid.

As the phase change material experiences multiple temperature changes, i.e., heatings and coolings, it sometimes experiences cracking or deformation during heating and/or cooling, especially during periods of phase change. To overcome this problem, the layer 28 of phase change component 30 desirably includes a reinforcing element 38 formed into its shape 34 as can be seen in FIG. 3. The reinforcing element 38 provides the layer 28 of phase change component 30 with structural support to prevent the phase change material from deforming and/or disintegrating due to mechanical stresses resultant from heating and cooling and undergoing multiple phase changes. The reinforcing element 38 is partially or wholly formed into the phase change component 30. The reinforcing element 38 can be a screen, grid, mesh or rods. If the reinforcing element 38 is a grid or mesh, it is desirably formed from temperature resistant synthetic, natural, or glass fibers or polytetrafluoroethylene (PTFE) or metal. Useful fibers for forming the reinforcing element 38 include, but are not limited to, cotton, cotton-polyester blends, fiberglass, and PTFE. Most desirably, the reinforcing element 38 will be a mesh formed from cotton fiber because cotton fiber can withstand temperatures up to 260° C. without combusting. Such a cotton mesh is available from the James Thompson Company of Wilmette, Illinois under the product designation, "Rug Canvas, 3.7 Pick."

The reinforcing element 38 can also be a metal screen, a metal grid, metal rods or another configuration which would stabilize the shape of the layer 28 of phase change component 30. Useful metals include any heat conducting metal which will not react with the phase change materials. Desirably, the metal will be either be copper or aluminum.

When the reinforcing element 38 is formed from a metal or other heat conductive material, the reinforcing element 38 can also serve as the heat transfer element 62 of heater assembly 40. In this instance, the reinforcing element 38 serves as both a reinforcement for the layer 28 of phase change component 30 and as a material which transfers heat throughout the layer 28 of phase change component 30. In this instance, the reinforcing element 38 is desirably positioned in the layer 28 of phase change component 30 close to the heater assembly 40. However, both a heat transfer element 62 and a reinforcing element 38 formed from metal may be used in conjunction with each other without negatively impacting the overall performance of the rechargeable phase change material unit 20.

Figure 4:
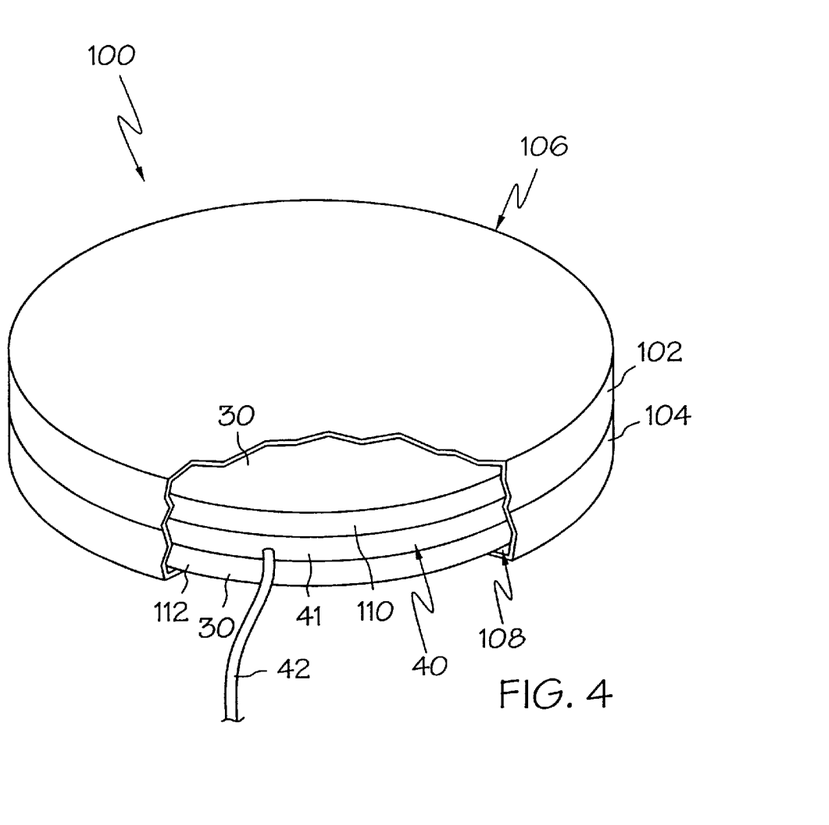
FIG. 4 presents a perspective view of another aspect of the phase change material unit shown with a portion of the shell being cutaway.

Another embodiment 100 of the rechargeable phase change material unit 20 of this invention is shown in FIG. 4. Embodiment 100 comprises a first shell portion 102 and a second shell portion 104 which form a shell 106. First shell portion 102 and second shell portion 104 define a cavity 108 there between. Embodiment 100 includes two layers of phase change component 30. A first layer 110 and a second layer 112 of phase change component 30 are positioned in the cavity 108. The first layer 110 of phase change component 30 is positioned adjacent to the first shell portion 102 and the second layer 112 of phase change component 30 is positioned adjacent the second shell portion 104.

Embodiment 100 further includes a heater assembly 40 positioned between the first layer 110 of phase change component 30 and the second layer 112 of phase change component 30. As described above, heater assembly 40 desirably includes a heating element 41. Heating element 41 further includes electric lead line(s) 42 which is provided to supply heating element 41 with electric current. Electric lead line(s) 42 can terminate in a connector such as a male plug, a female plug, alligator clips, a banana plug, battery connectors, battery adapters, current adapters and other similar devices to connect the heating element 41 to a power source. The power source can be either an alternating current or a direct current power source. Embodiment 100 can be adapted with a female plug and can be positioned along the periphery of shell 106 so that detachable electric lead lines 42 can be used. The heating element 41 can be a printed circuit, an imbedded wire in the phase change material or a laminated wire in a flexible silicone heating element, such as that shown in FIGS. 5 and 6. The heating element 41 desirably conforms to the size of the cavity 108. The heating element 41 also desirably includes a temperature sensitive element 46 which controls the temperature to which the phase change component 30 is heated during the charging process. Useful temperature sensitive elements 46 are listed and described above.

Desirably, each layer 110 and 112 of phase change component 30 of the embodiment 100 of the rechargeable phase change material unit 20 will also include a reinforcing element 38, as described above and shown in FIG. 3, formed as part of the layers 110 and 112 of phase change component 30. As stated above, the reinforcing element 38 is provided to prevent deformation and/or disintegration of the layers 110 and 112 of phase change component 30 during periods of temperature change and phase change. As also described above, the reinforcing element 38 is desirably formed in the middle of the layers 110 and 112 of phase change component 30.

Figure 5:
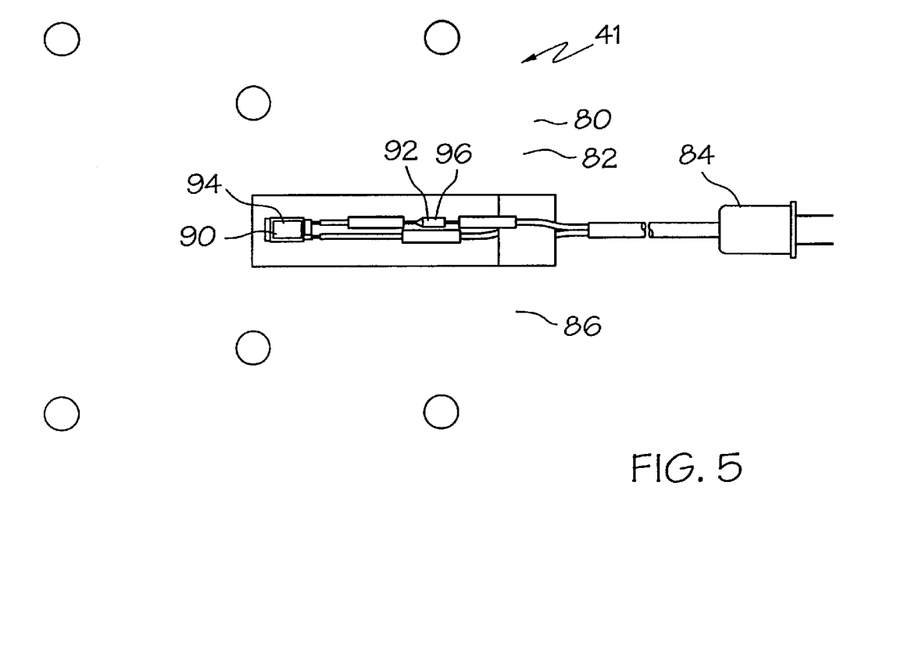
FIG. 5 presents a plan view of a heater assembly useful with this invention.
Figure 6:
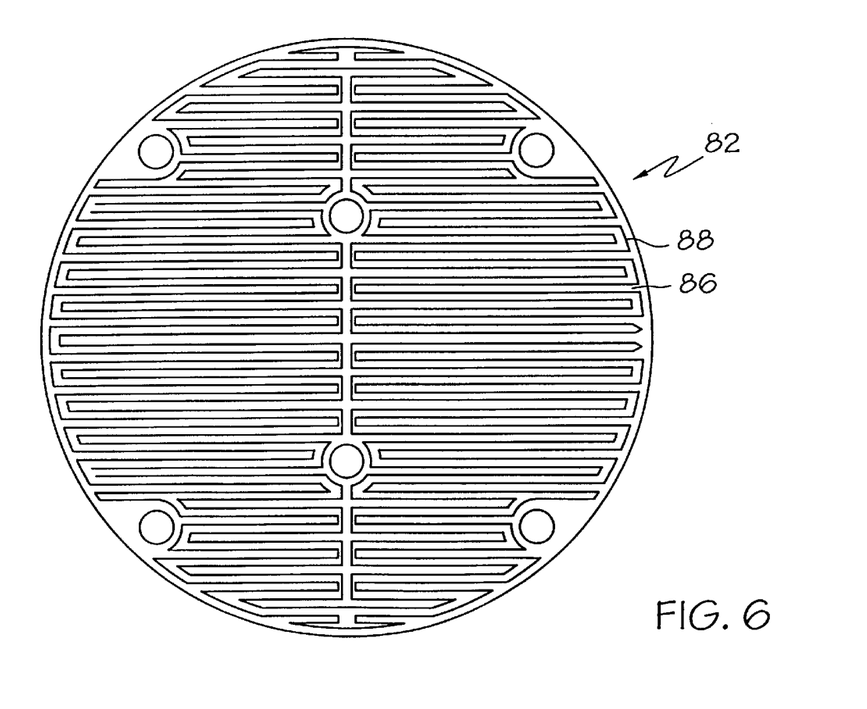
FIG. 6 presents a cross sectional view of the heater assembly shown in FIG. 5.

As shown in FIG. 5, heating element 41 is desirably a flexible silicone heater assembly 80. Such a flexible silicone heater assembly 80 is available from Heater Designs, Inc. of Bloomington, Calif. The heater assembly 80 includes a flexible heating element 82 which is connected to a power cord 84. The heating element 82 includes a silicone body 86 and a wire layout 88, which is shown in FIG. 6. The wire layout 88 is enclosed in the silicone body 86. The flexible heating element 82 also includes a first temperature sensitive element 90 and a second temperature sensitive element 92. The first temperature sensitive element 90 can be a thermistor, a thermostat or a thermal protection fuse. Desirably, the first temperature sensitive element 90 is a thermostat 94. The second temperature sensitive element 92 can be a thermistor, a thermostat or a thermal protection fuse. Desirably, the second temperature sensitive element 92 is a thermal protection fuse 96. Although not shown, first temperature sensitive element 90, second temperature sensitive element 92 and their associated wiring are covered with a cover formed the same silicone material used to form silicone body 86. Additionally, it may be necessary to form an area in either layer 110 or layer 112 of phase change component 30 to accommodate first temperature sensitive element 90, second temperature sensitive element 92 and their associated wiring.

A useful wire layout 88 is shown in FIG. 6. With wire layout 88, the phase change material contained in layers 110 and 112 of phase change component 30 can effectively be heated without the use of heat transfer element, such as heat transfer element 62 shown in FIG. 1. As can also be seen in FIG. 6, the wire layout 88 is embedded in the silicone body 86. Although the silicone acts an electrical insulator, it does not act as a thermal insulator so that heat generated by the wire layout 88 passes through the silicone body 86 to the phase change component 30. One of skill in the art will appreciate that wire layout 88 can take any form and still effectively heat the phase change material.

The embodiment 100 of the phase change material unit 20 functions in the following manner. Again, the heater assembly 40 is supplied with electricity which causes it to become heated. Particularly, the flexible silicone heater assembly 80 is supplied with electricity and the wire layout 88 becomes heated. The heat generated by the wire layout 88 passes through the silicone body 86 and then heats phase change materials in the layer 110 and the layer 112 of phase change component 30 to their melting points charging them with heat energy. Because of the compact configuration of the wire layout 88, the first layer 110 and the second layer 112 of phase change component 30 are evenly heated. The thermostat 94 cuts off power to the wire layout 88 once the wire layout 88 attains a desired temperature. The layers 110 and 112 of phase change component 30 then radiate heat through shell 106 to heat the object to be heated.

To prevent the flexible silicone heater assembly 80 from becoming overheated, thermal protection fuse 96 is provided. Thermal protection fuse 96 cuts off the circuit which supplies wire layout 88 with electricity once the wire layout 88 attains a predetermined temperature. This is particularly necessary if the thermostat 94 has failed.

Figure 7:
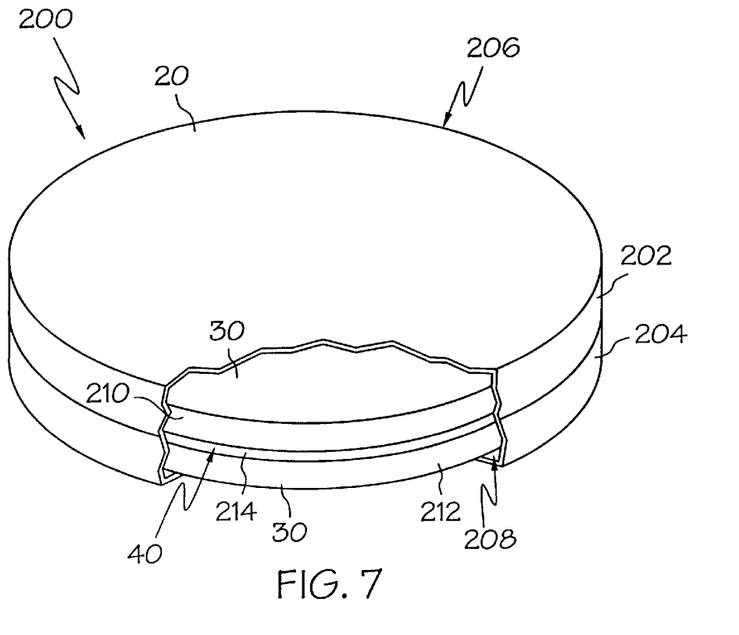
FIG. 7 presents a perspective view, with a portion of the shell being cut away, of another aspect of the rechargeable phase change material unit of this invention.

FIG. 7 presents a perspective of an another embodiment 200 of the rechargeable phase change material unit 20. In embodiment 200 of the phase change material unit 20, a first shell portion 202 and a second shell portion 204 form a shell 206 having a cavity 208 therein. The cavity 208 contains a first layer 210 of phase change component 30 and a second layer 212 of phase change component 30. The first layer 210 is positioned adjacent to the first shell portion 202 and the second layer 212 is positioned adjacent to the second shell portion 204. A heater assembly 40 is positioned between the first layer 210 of phase change component 30 and the second layer 212 of phase change component 30.

In this embodiment, the heater assembly 40 comprises a heat transfer element 214. The heat transfer element 214 serves to charge the phase change material with heat energy and to distribute that heat energy throughout the phase change component 30. Useful heat transfer elements 214 are formed from a heat conductive material such as a metal. Useful metals include copper, iron, nickel, aluminum, metal alloys and other heat conductive metal which would not react adversely with the phase change component 30 and which would not corrode after repeated heating and cooling. The heat transfer element 214 may be in the form of a screen, a sheet, bars, a flat coil, or any other shape which would effectively conduct heat energy to the phase change component 30. The heat transfer element 214 may also be formed from a microwave susceptor material. Desirably, the heat transfer element 214 is in the form of sheet. Desirably, the heat transfer element 214 is either an aluminum foil sheet or a copper screen.

The phase change component 30 may also contain a reinforcing element, such as the reinforcing element 38 which is shown and described above in detail. As with other embodiments of the rechargeable phase change material unit 20, the reinforcing element 38 may be formed from a metal or other heat conductive material such that the reinforcing element serves to charge the phase change material unit with heat energy and to distribute that heat energy throughout the layer of phase change component 30. In such a case, the reinforcing element 38 would take the place of the heat transfer element 214. With embodiment 200, the reinforcing element 38 can also be formed from temperature resistant synthetic, natural, or glass fibers or polytetrafluoroethylene (PTFE). Useful fibers for forming the reinforcing element include, but are not limited to, cotton, cotton-polyester blends, fiberglass, and PTFE.

The embodiment 200 of the rechargeable phase change material unit 20 functions in the following manner. The embodiment 200 is designed to be heated by a convection or radiant heat source. The embodiment 200 is placed in proximity to a heat source, such as, for example, a convection oven. The layers 210 and 212 of phase change component 30 are heated by both the heat source and by the heat transfer element 214. Because it is formed from a heat conductive material, the heat transfer material 214 heats faster than the phase change material in phase change component 30. Thus, the layers 210 and 212 of phase change component 30 are heated from both sides. The embodiment 200 of the rechargeable phase change material unit 20 is then brought into contact with the object to be heated. The object is then heated as the phase change material in component 30 radiates heat.

Figure 8:
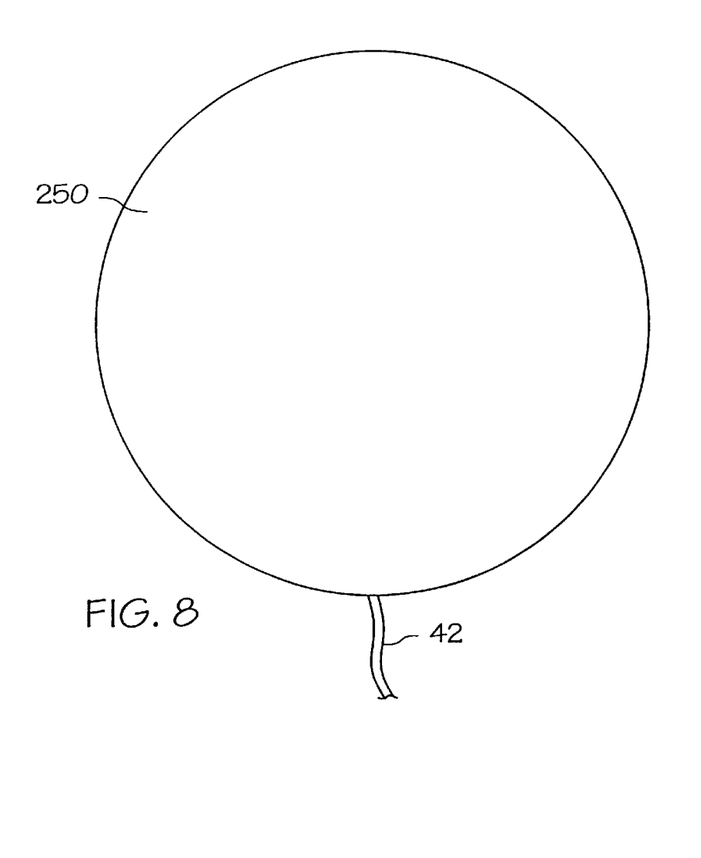
FIG. 8 presents a top view of a pizza heater of this invention.

With reference to FIG. 8, the rechargeable phase change material unit 20 is shown in the form of a pizza heater 250. The pizza heater 250 can include one or more layers of phase change material 30. The pizza heater 250 can be configured in the same manner as either embodiment 18, embodiment 100 or embodiment 200, which are described above in detail. Desirably, the pizza heater 250 will be configured in the same manner as embodiment 100. One skilled in the art will appreciate that the pizza heater 250 can be used by itself to heat a pizza, e.g., by placing a pizza directly on the pizza heater 250. Pizza heater 250 may also be used to heat pizzas during delivery by placing pizza heater 250 in a container, such as container 12. Desirably, the container will be insulated. When used in container 12, it is desirable that the electric lead line(s) 42 terminate in a direct current adapter, such as, for example, cigarette lighter adapter or an auxiliary power adapter, so that the electrical supply of an automobile may be used to change phase material unit 30. If the pizza heater 250 takes the form of embodiment 200 of the phase change matrial unit 20, then the pizza heater 250 can be charged with heat energy simultaneously in an oven with the pizza which it will be used to heat.

The shells 22, 106 and 206 of the various embodiments are formed from a non-metallic material, such as plastic, which is resistant to the temperatures generated by the phase change material, i.e., a material which will not crack or deform when heated to the melting point of the phase change material. In other words, the material must be capable of being repeatedly heated without becoming damaged. Such material will reduce the weight of the rechargeable phase change material unit 20 or the pizza heater 250. Useful materials include, but are not limited to, polycarbonate, FORTRON®, and fiberglass reinforced polymeric materials, such as, for example, fiberglass reinforced polypropylene or fiberglass reinforced polyurethane. Desirably, the shells 22, 106 and 206 are formed from polycarbonate. A useful polycarbonate is available from Co-Mac Tech of Vista, California under the trade name Polycarbonate AVP.

One skilled in the art will also appreciate that the layers of phase change component 30 can have any size and shape which would facilitate function of the present invention. Additionally, the various shells 22, 106 and 206 can take any shape and are not limited to being round in configuration. In such instances, the layers of phase change component 30 will desirably take the shape of the shell in which it is placed.

While certain representative embodiments and details have been shown for purposes of illustrating the invention, it will be apparent to those skilled in the art that various changes in the compositions and apparatus disclosed herein may be made without departing from the scope of the invention, which is defined in the appended claims.

What is claimed is:

1. A device for heating food comprising a container and a rechargeable phase change material unit removably positioned in said container, said rechargeable phase change material unit including a first shell portion and a second shell portion forming a shell having a cavity; at least one layer of a solid phase change component having a discrete shape disposed in said cavity of said shell; said phase change component including a phase change material selected from the group consisting of linear crystalline alkyl hydrocarbons, alkyl hydrocarbon waxes, crystalline fatty acids, linear crystalline primary alcohols, ethylene copolymers, polyethylene, polyethylene glycol, polyethylene oxide, and acetamide; and wherein said phase change material is capable of being charged with heat energy by a heat source selected from the group consisting of conduction, convection, radiant heat, electrical resistance, electrical inductance, microwave heat, radio frequency, or combinations thereof to maintain said device at a desired temperature.

2. The device of claim 1 wherein said phase change material has a melting point of from about 25° C. to 100° C.

3. The heating device of claim 1 wherein said heat source comprises microwave heat and said phase change material includes a microwave absorbing additive.

4. The heating device of claim 1 wherein said container comprises a pizza warmer.

5. The heating device of claim 1 wherein said container comprises tableware.

6. The heating device of claim 1 further including a heater assembly positioned on one side of said layer of phase change component, said heater assembly being provided to charge said phase change material with heat energy and distribute heat energy throughout said layer of phase change material during the charging of said phase change material.

7. The heating device of claim 6 wherein said heater assembly includes a heating element to charge said phase change material with heat energy and a heat transfer element to distribute heat from said heating element throughout said layer of phase change component during the charging of said phase change material.

8. The heating device of claim 7 wherein said heating element is a printed circuit, an imbedded wire, or a laminated wire in a flexible silicone heater assembly.

9. The heating device of claim 1 wherein said phase change component is in the form of a solidified melt mixture of from about 60% by weight of said phase change material, 16% by weight high density polyethylene, 8% by weight of an ethylene-vinyl acetate copolymer, and 16% by weight silica.

10. The heating device of claim 1 wherein said phase change component is in the form of a crosslinked high density polyethylene sheet permeated with a linear crystalline alkyl hydrocarbon phase change material.

11. A device for heating food comprising a container and a rechargeable phase change material unit removably positioned in said container, said rechargeable phase change material unit including a first shell portion and a second shell portion forming a shell having a cavity; at least one layer of a solid phase change component having a discrete shape disposed in said cavity of said shell, said phase change component comprising a solidified melt mixture of a polyolefin resin, an ethylene copolymer, silica particles and a phase change material, wherein said phase change material is capable of being charged with heat energy by a convection oven to maintain said device at a desired temperature.

12. The device of claim 10 wherein said phase change material has a melting point of from about 25° C. to 100° C.

13. The device of claim 12 wherein said melt mixture comprises from about 60% by weight of said phase change material, 16% by weight high density polyethylene, 8% by weight of an ethylene-vinyl acetate copolymer, and 16% by weight silica.

14. The device of claim 13 wherein said phase change material comprises an ethylene-propylene copolymer.

15. The heating device of claim 11 wherein said container comprises a pizza warmer.

16. The heating device of claim 11 wherein said container comprises tableware.

17. A device for heating food comprising a container and a rechargeable phase change material unit removably positioned in said container, said rechargeable phase change material unit including a first shell and a second shell portion forming a shell having a cavity; at least one layer of a solid phase change component having a discrete shape disposed in said cavity of said shell, said phase change component comprising a porous product which has been imbibed with a phase change material, containing up to about 5% by weight of a polymeric thickening agent, wherein said phase change material is capable of being charged with heat energy by a heat source to maintain said device at a desired temperature.

18. The heating device of claim 17 wherein said phase change material is an alkyl hydrocarbon.

19. The heating device of claim 17 wherein said polymeric thickening agent is selected from the group consisting of an ethylene-propylene copolymer, a styrene-butadiene copolymer, butyl rubber, and polyethylene.

20. The heating device of claim 17 wherein said heat source is selected from the group consisting of conduction, convection, radiant heat, electrical resistance, electrical inductance, microwave, radio frequency, or combinations thereof.

21. The heating device of claim 17 wherein said heat source comprises microwave or radio frequency and said phase change material includes an additive selected from the group consisting of water, glycerol, glycerol esters, polyethylene glycol, and carbon black.

22. The heating device of claim 17 further including a heater assembly positioned on one side of said layer of phase change component, said heater assembly being provided to charge said phase change material with heat energy and distribute heat energy throughout said layer of phase change material during the charging of said phase change material.

23. The heating device of claim 17 wherein said heater assembly includes a heating element to charge said phase change material with heat energy and a heat transfer element to distribute heat from said heating element throughout said layer of phase change component during the charging of said phase change material.

* * * * *